(12) United States Patent
Martinez

(10) Patent No.: US 10,358,021 B2
(45) Date of Patent: Jul. 23, 2019

(54) VEHICLE PROTECTION ASSEMBLY

(71) Applicant: Josh Martinez, Westminster, CO (US)

(72) Inventor: Josh Martinez, Westminster, CO (US)

( * ) Notice: Subject to any disclaimer, the term of this patent is extended or adjusted under 35 U.S.C. 154(b) by 177 days.

(21) Appl. No.: 15/426,825

(22) Filed: Feb. 7, 2017

(65) Prior Publication Data

US 2018/0222303 A1    Aug. 9, 2018

(51) Int. Cl.
*B60J 11/04* (2006.01)

(52) U.S. Cl.
CPC ..................... *B60J 11/04* (2013.01)

(58) Field of Classification Search
CPC ........................................................ B60J 11/04
See application file for complete search history.

(56) References Cited

U.S. PATENT DOCUMENTS

| D42,622 S | 6/1912 | Gafinowitz | |
|---|---|---|---|
| 4,294,483 A | 10/1981 | Ferris | |
| 5,242,206 A * | 9/1993 | Heck | B60J 11/00 150/166 |
| 5,287,904 A | 2/1994 | Smith et al. | |
| 5,890,525 A | 4/1999 | Shores | |
| 6,070,629 A * | 6/2000 | Whiteside | B60J 11/00 150/166 |
| 6,334,537 B1 * | 1/2002 | Tepper | A45C 7/0081 206/315.1 |
| 6,439,644 B1 | 8/2002 | Jester | |
| 7,360,820 B2 | 4/2008 | Tellez | |
| 2007/0284023 A1 * | 12/2007 | Sitarz | B60J 11/00 150/166 |
| 2009/0249700 A1 * | 10/2009 | Peterson | A45F 3/08 52/2.17 |
| 2010/0326017 A1 * | 12/2010 | Kindel | B60J 11/00 53/461 |
| 2014/0150937 A1 * | 6/2014 | Favalora, III | B60J 11/04 150/166 |

FOREIGN PATENT DOCUMENTS

WO    WO2014089176    6/2014

* cited by examiner

*Primary Examiner* — Tri M Mai

(57) ABSTRACT

A vehicle protection assembly for protecting a vehicle from hail damage includes a tarp that is selectively placed over a vehicle thereby facilitating the tarp to completely cover the vehicle. A bladder is positioned within the tarp and the bladder is selectively inflated. The bladder absorbs impact energy from hail thereby inhibiting the hail from damaging the vehicle when the tarp is positioned on the vehicle. A plurality of straps is provided and each of the straps is removably coupled to the tarp. Each of the straps is extended beneath the vehicle when the tarp is positioned on the vehicle to retain the tarp on the vehicle.

5 Claims, 3 Drawing Sheets

VEHICLE PROTECTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to protection devices and more particularly pertains to a new protection device for protecting a vehicle from hail damage.

BRIEF SUMMARY OF THE INVENTION

An embodiment of the disclosure meets the needs presented above by generally comprising a tarp that is selectively placed over a vehicle thereby facilitating the tarp to completely cover the vehicle. A bladder is positioned within the tarp and the bladder is selectively inflated. The bladder absorbs impact energy from hail thereby inhibiting the hail from damaging the vehicle when the tarp is positioned on the vehicle. A plurality of straps is provided and each of the straps is removably coupled to the tarp. Each of the straps is extended beneath the vehicle when the tarp is positioned on the vehicle to retain the tarp on the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
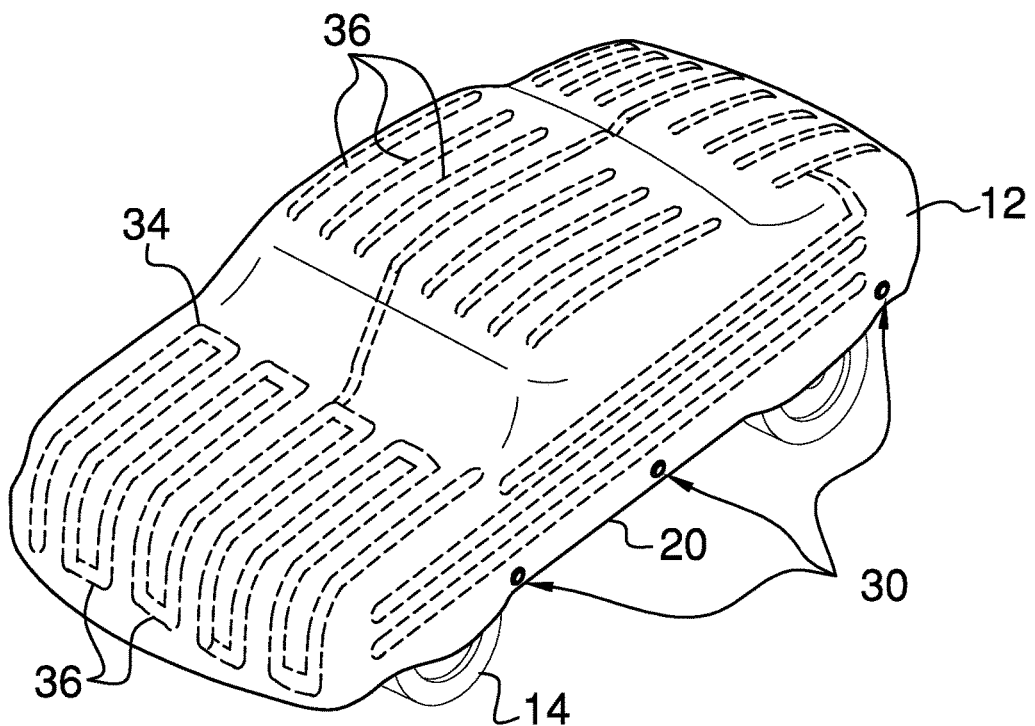
FIG. 1 is a perspective phantom view of a vehicle protection assembly according to an embodiment of the disclosure.
Figure 2:
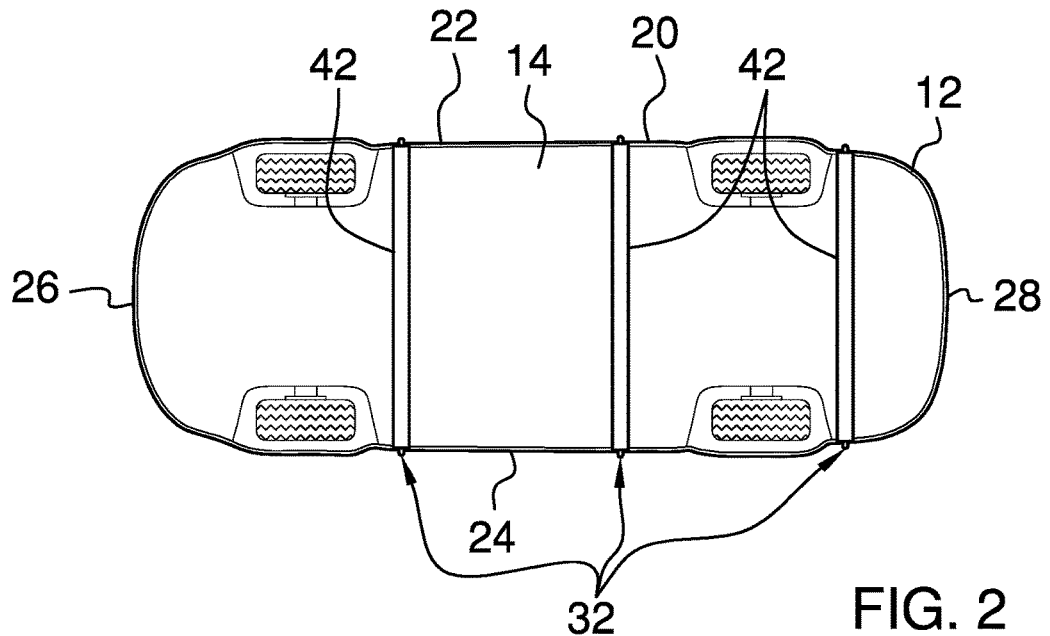
FIG. 2 is a bottom view of an embodiment of the disclosure.
Figure 3:
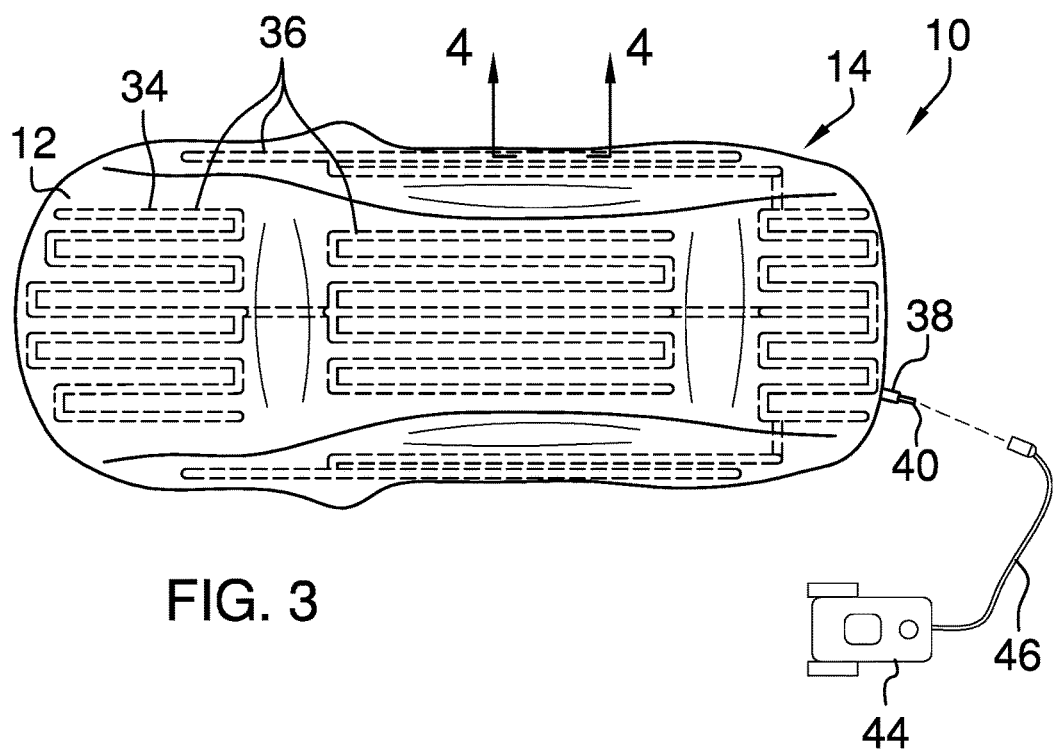
FIG. 3 is a top phantom view of an embodiment of the disclosure.
Figure 4:
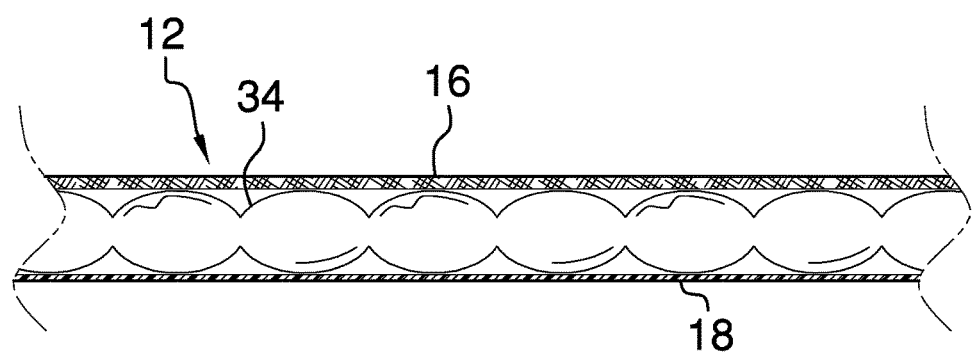
FIG. 4 is a cross sectional view taken along line 4-4 of FIG. 3 of an embodiment of the disclosure.
Figure 5:
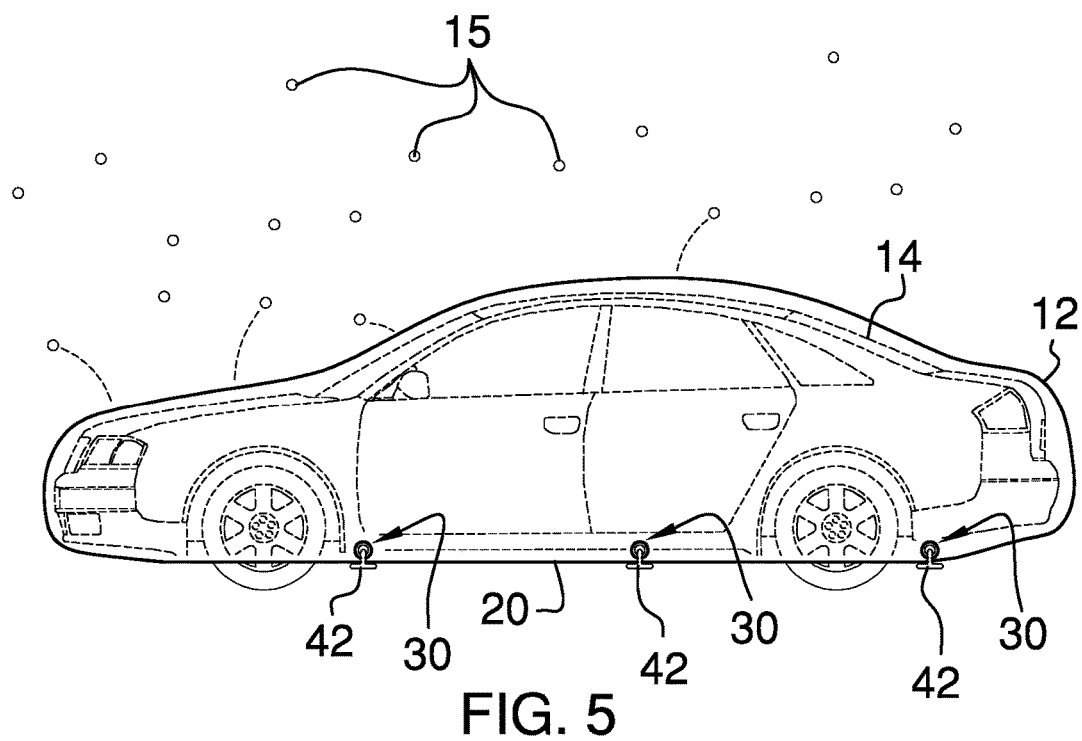
FIG. 5 is a perspective in-use view of an embodiment of the disclosure.

With reference now to the drawings, and in particular to FIGS. 1 through 5 thereof, a new protection device embodying the principles and concepts of an embodiment of the disclosure and generally designated by the reference numeral 10 will be described.

As best illustrated in FIGS. 1 through 5, the vehicle protection assembly 10 generally comprises a tarp 12 that is selectively placed over a vehicle 14 thereby facilitating the tarp 12 to completely cover the vehicle 14. The tarp 12 is positioned over the vehicle 14 when frozen precipitation 15 such as hail is expected. The vehicle 14 may be a passenger vehicle, a commercial vehicle or any other vehicle that has deformable body panels. Moreover, the tarp 12 covers a top side, a front side, a back sides, a bottom side, a right side and a left side of the vehicle 14 when the tarp 12 is positioned on the vehicle 14. The tarp 12 is manufactured in a variety of sizes to accommodate varying sizes of vehicles.

The tarp 12 has a top layer 16 and a bottom layer 18. The top layer 16 is comprised of a fluid impermeable material such as poly vinyl chloride or the like. The bottom layer 18 abuts the vehicle 14 when the tarp 12 is positioned on the vehicle 14 and the bottom layer 18 is comprised of a resiliently compressible material such as a rubberized gel or the like. In this way the bottom layer 18 inhibits paint on the vehicle 14 from being abraded by the tarp 12.

Each of the top layer 16 and the bottom layer 18 is coupled together along a perimeter 20 of the tarp 12. Moreover, the perimeter 20 has a first lateral side 22, a second lateral side 24, a front side 26 and a back side 28. The tarp 12 has a plurality of first apertures 30 extending through each of the top layer 16 and the bottom layer 18. The plurality of first apertures 30 is aligned with the first lateral side 22 of the tarp 12 and the first apertures 30 are spaced apart from each other and distributed along the first lateral side 22. The tarp 12 has a plurality of second apertures 32 extending through each of the top layer 16 and the bottom layer 18. The plurality of second apertures 32 is aligned with the second lateral side 24 of the tarp 12 and the second apertures 32 are spaced apart from each other and distributed along the second lateral side 24.

A bladder 34 is positioned between the top layer 16 and the bottom layer 18 of the tarp 12. The bladder 34 is selectively inflated to absorb impact energy from frozen precipitation 15. In this way the bladder 34 inhibits the frozen precipitation 15 from damaging the vehicle 14 when the tarp 12 is positioned on the vehicle 14. The bladder 34 is positioned between the top layer 16 and the bottom layer 18 and the bladder 34 comprises a network of tubes 36. The tubes 36 are in fluid communication with each other and the tubes 36 are spaced apart from each other and are distributed on the tarp 12.

A valve 38 is fluidly coupled to the bladder 34 to selectively pass air into and out of the bladder 34. The valve 38 extends outwardly through the top layer 16 and the valve 38 has a distal end 40 with respect to the top layer 16. The distal end 40 is open and the valve 38 is selectively positioned between an open position and a closed position. The valve 38 may be an air valve of any conventional design such as a valve stem or the like.

A plurality of straps 42 is provided and each of the straps 42 is removably coupled to the tarp 12. Each of the straps 42 is extended beneath the vehicle 14 when the tarp 12 is positioned on the vehicle 14 to retain the tarp 12 on the vehicle 14. Each of the straps 42 may be comprised of a resiliently stretchable material such as bungee cord or the like. Each of the straps 42 extends between the first lateral side 22 and the second lateral side 24 of the tarp 12. The straps 42 are spaced apart from each other and are distributed between the front side 26 and the back side 28 of the tarp 12. Each of the straps 42 removably engages an associated pair of the first and second apertures 32 in the tarp 12.

A pump 44 is provided and the pump 44 is selectively fluidly coupled to the valve 38 to inflate the bladder 34. The pump 44 has an output hose 46 and the output hose 46 is selectively fluidly coupled to the distal end 40 of the valve 38. The pump 44 may be an electric compressor, a hand actuated pump 44 or any other conventional air pump 44.

In use, the tarp 12 is positioned on the vehicle 14 when hail or other frozen precipitation 15 is expected that can potentially damage the vehicle 14. Each of the straps 42 is extended beneath the vehicle 14 and each of the straps 42 is removably coupled to the tarp 12. In this way the straps 42 retain the tarp 12 on the vehicle 14. The valve 38 is manipulated into the open position and the pump 44 is fluidly coupled to the valve 38. The pump 44 is actuated to inflate the bladder 34 and the valve 38 is manipulated into the closed position when the bladder 34 is fully inflated. In this way the bladder 34 absorbs impact energy from the frozen precipitation 15 thereby inhibiting the vehicle 14 from being dented by the frozen precipitation 15. The pump 44 is removed from the valve 38 when the bladder 34 is fully inflated. The tarp 12 remains on the vehicle 14 until such time that the frozen precipitation 15 is no longer expected.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle protection assembly being configured to inhibit a vehicle from being damaged by hail, said assembly comprising:

a tarp being configured to be selectively placed over a vehicle thereby facilitating said tarp to completely cover the vehicle, said tarp having a top layer and a bottom layer, said top layer being comprised of a fluid impermeable material, said bottom layer being comprised of a resiliently compressible material wherein said bottom layer is configured to inhibit paint on the vehicle from being abraded by said tarp, each of said top layer and said bottom layer being coupled together along a perimeter of said tarp, said perimeter having a first lateral side, a second lateral side, a front side and a back side;

a bladder being positioned within said tarp, said bladder being selectively inflated wherein said bladder is configured to absorb impact energy from hail thereby inhibiting the hail from damaging the vehicle when said tarp is positioned on the vehicle, said bladder being positioned between said top layer and said bottom layer, said bladder comprising a plurality of tubes, said tubes being in fluid communication with each other, said plurality of tubes including a plurality of longitudinally oriented tubes extending between said front side and said back side and being spaced laterally apart from each other defining spaces between adjacently positioned longitudinally oriented tubes and said top layer and said bottom layer, said longitudinally oriented tubes being arranged into a hood array, a roof array, a trunk array, and a pair of side arrays each being configured for covering respectively a hood, a roof, a trunk, and lateral sides of the vehicle; and a plurality of straps, each of said straps being removably coupled to said tarp, each of said straps being configured to be extended beneath the vehicle when said tarp is positioned on the vehicle to retain said tarp on the vehicle.

2. The assembly according to claim 1, further comprising a valve being fluidly coupled to said bladder wherein said valve is configured to selectively pass air into and out of said bladder, said valve extending outwardly through a top layer of said tarp, said valve having a distal end with respect to said top layer, said distal end being open, said valve being selectively positioned between an open position and a closed position.

3. The assembly according to claim 2, further comprising a pump being selectively fluidly coupled to said valve to inflate said bladder, said pump having an output hose, said output hose being selectively fluidly coupled to said distal end of said valve.

4. The assembly according to claim 1, wherein each of said straps extends between said first lateral side and said second lateral side of said tarp, said straps being spaced apart from each other and being distributed between said front side and said back side of said tarp.

5. A vehicle protection assembly being configured to inhibit a vehicle from being damaged by hail, said assembly comprising:

a tarp being configured to be selectively placed over a vehicle thereby facilitating said tarp to completely cover the vehicle, said tarp having a top layer and a bottom layer, said top layer being comprised of a fluid impermeable material, said bottom layer being comprised of a resiliently compressible material wherein said bottom layer is configured to inhibit paint on the vehicle from being abraded by said tarp, each of said top layer and said bottom layer being coupled together along a perimeter of said tarp, said perimeter having a first lateral side, a second lateral side, a front side and a back side;

a bladder being positioned between said top layer and said bottom layer of said tarp, said bladder being selectively inflated wherein said bladder is configured to absorb impact energy from hail thereby inhibiting the hail from damaging the vehicle when said tarp is positioned on the vehicle, said bladder being positioned between said top layer and said bottom layer, said bladder comprising a plurality of tubes, said tubes being in fluid communication with each other, said bladder being positioned between said top layer and said bottom layer, said bladder comprising a plurality of tubes, said tubes being in fluid communication with each other, said plurality of tubes including a plurality of longitudinally oriented tubes extending between said front side and said back side and being spaced laterally apart from each other defining spaces between adjacently positioned longitudinally oriented tubes and said top layer and said bottom layer, said longitudinally oriented tubes being arranged into a hood array, a roof array, a trunk array, and a pair of side arrays each being configured for covering respectively a hood, a roof, a trunk, and lateral sides of the vehicle;

a valve being fluidly coupled to said bladder wherein said valve is configured to selectively pass air into and out of said bladder, said valve extending outwardly through said top layer, said valve having a distal end with respect to said top layer, said distal end being open, said valve being selectively positioned between an open position and a closed position;

a plurality of straps, each of said straps being removably coupled to said tarp, each of said straps being configured to be extended beneath the vehicle when said tarp is positioned on the vehicle to retain said tarp on the vehicle, each of said straps extending between said first lateral side and said second lateral side of said tarp, said straps being spaced apart from each other and being distributed between said front side and said back side of said tarp; and a pump being selectively fluidly coupled to said valve to inflate said bladder, said pump having an output hose, said output hose being selectively fluidly coupled to said distal end of said valve.

* * * * *